United States Patent
Risney, Jr. et al.

(10) Patent No.: US 8,037,135 B2
(45) Date of Patent: Oct. 11, 2011

(54) AUTOMATIC DISTRIBUTED DOWNLOADING

(75) Inventors: Dave L Risney, Jr., Redmond, WA (US); Vishu Gupta, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 314 days.

(21) Appl. No.: 11/772,011

(22) Filed: Jun. 29, 2007

(65) Prior Publication Data

US 2009/0006538 A1     Jan. 1, 2009

(51) Int. Cl.
G06F 15/16 (2006.01)

(52) U.S. Cl. ........ 709/205; 709/201; 709/227; 709/219; 370/252; 370/352

(58) Field of Classification Search .................. 709/205
See application file for complete search history.

(56) References Cited

U.S. PATENT DOCUMENTS

| | | | |
|---|---|---|---|
| 6,061,733 A | 5/2000 | Bodin et al. | |
| 6,195,678 B1 | 2/2001 | Komuro | |
| 6,223,224 B1 | 4/2001 | Bodin | |
| 6,532,495 B1 | 3/2003 | Welles, II et al. | |
| 6,874,084 B1 | 3/2005 | Dobner et al. | |
| 6,973,479 B2 | 12/2005 | Brady, Jr. et al. | |
| 7,818,402 B1 * | 10/2010 | Zhang | 709/219 |
| 2002/0124172 A1 | 9/2002 | Manahan | |
| 2002/0184491 A1 | 12/2002 | Morgan et al. | |
| 2003/0028762 A1 | 2/2003 | Trilli et al. | |
| 2004/0107143 A1 | 6/2004 | Niemi | |
| 2004/0122741 A1 * | 6/2004 | Sidman | 705/26 |
| 2004/0148344 A1 * | 7/2004 | Navar et al. | 709/203 |
| 2005/0268100 A1 | 12/2005 | Gasparini et al. | |
| 2006/0031537 A1 | 2/2006 | Boutboul et al. | |
| 2006/0053293 A1 | 3/2006 | Zager et al. | |
| 2006/0212542 A1 * | 9/2006 | Fang et al. | 709/219 |
| 2006/0212584 A1 * | 9/2006 | Yu et al. | 709/227 |
| 2006/0218403 A1 | 9/2006 | Sauve et al. | |
| 2006/0230127 A1 | 10/2006 | Farouki et al. | |
| 2008/0133535 A1 * | 6/2008 | Fischer et al. | 707/10 |

FOREIGN PATENT DOCUMENTS

WO    WO0111466 A2    2/2001

OTHER PUBLICATIONS

Marshall, "Free Download manager", available at least as early as Feb. 15, 2007, at <<http://www.freedownloadmanager.org/>>, FreeDownloadManager.ORG, 2004-2005, pp. 1-2.

(Continued)

*Primary Examiner* — Tammy Nguyen
*Assistant Examiner* — Natisha Cox (57) ABSTRACT

Automatic distributed downloading (ADD) may involve, for example, enabling the downloading of a resource via a peer-to-peer (P2P)-based protocol from a uniform resource identifier (URI). In an example embodiment, an ADD module includes a directory client that sends to a directory service a mapping request including a URI corresponding to a targeted resource and receives a mapping response including P2P session connection information. The targeted resource can be retrieved over a P2P network via a P2P-based protocol using the P2P session connection information. In another example embodiment, a mapping data structure is accessed with reference to a URI. An entry corresponding to the referenced URI is ascertained and P2P session connection information from the entry is extracted. The URI corresponds to a source making the resource available via a client-server-based protocol, and the P2P session connection information makes the resource available via a P2P-based protocol.

17 Claims, 8 Drawing Sheets

OTHER PUBLICATIONS

"Multipoint FTP Server 0.9.4", retrieved on Feb. 15, 2007, at <<http://www.shareup.com/Multipoint_FTP_Server-download-19619.html>>, Shareup Networks, 2000-2007, pp. 1-3.

Plank, et al., "Algorithms for high performance, wide-area distributed file downloads", avaliable at least as early as on Feb. 14, 2007, at <<http://loci.cs.utk.edu/lors/files/algorithms.pdf>>, World Scientific Publishing Company, vol. 13, No. 2, 2003, pp. 1-17 pp. 207-223.

Vazhkudai, "Distributed Downloads of Bulk, Replicated Grid Data", available at least as early as on Feb. 14, 2007 at <<http://www.csm.ornl.gov/~vazhkuda/Journal-Grid04.pdf>>, Kluwer Academic Publishers, 2004, pp. 31-42.

Verisign Inc., "Licensing verisign certificates: securing multiple web server and domain configurations", www.msctrustdate.com/pdf/licensing.pdf, white paper,(2001).

Herzberg, Amir et al., "Protecting valve web users, or preventing spoofing and establishing credential sites", www.cs.bu.ac.il/~herzea/papers/ecommerce/trusted_credentials_area.pdf, Bar Ilan University,(Jul. 2004).

NCIPHER Inc., "Protecting commercial secure web servers from key-finding treats", www.ncipher.com/uploads/resources/pcws.pdf, white paper, (1999).

* cited by examiner

Example Method for Client-Side of ADD

FIG. 6

Example Method for Network-Side of ADD

AUTOMATIC DISTRIBUTED DOWNLOADING

BACKGROUND

Web browsers enable users to acquire files over the internet. A server that stores files can provide web pages over the internet. When a web page is displayed at a client device by a web browser, text or an icon may serve as a link that both represents and makes available a particular file. When a user selects the link, a download manager contacts the server and acquires a copy of the particular file from the server for the user of the client device. This approach to downloading a file can, unfortunately, be exceptionally slow. Additionally, this approach to downloading files can be equally slow in other, non-browser-related file acquisition scenarios.

SUMMARY

Automatic distributed downloading (ADD) may involve, for example, enabling the downloading of a resource via a peer-to-peer (P2P)-based protocol from a uniform resource identifier (URI). In an example embodiment, an ADD module includes a directory client that sends to a directory service a mapping request including a URI corresponding to a targeted resource and receives a mapping response including P2P session connection information. The targeted resource can be retrieved over a P2P network via a P2P-based protocol using the P2P session connection information. In another example embodiment, a mapping data structure is accessed with reference to a URI. An entry corresponding to the referenced URI is ascertained and P2P session connection information from the entry is extracted. The URI corresponds to a targeted resource and a source that makes the targeted resource available via a client-server-based protocol, and the P2P session connection information enables connection to a P2P session that makes the targeted resource available via a P2P-based protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, application programming interface (API), arrangement, etc. implementations are described herein.

BRIEF DESCRIPTION OF THE DRAWINGS

The same numbers are used throughout the drawings to reference like and/or corresponding aspects, features, and components.

DETAILED DESCRIPTION

Introduction to Automatic Distributed Downloading

There are two primary modes by which files are downloaded over the internet. With one mode, a server hosts a file and serves it to multiple clients (e.g., in accordance with a Hypertext Transfer Protocol (HTTP)). A disadvantage with this mode is that the server has to be sufficiently powerful to serve a large number of requests, possibly simultaneously. For large file sizes, when multiple downloads from the server are sharing bandwidth, the download speed can potentially decrease significantly. Due at least partially to this aspect of the server-client mode, another mode of downloading is a peer-to-peer (P2P) mode. With the P2P mode, a client downloads a desired file from a multitude of other clients (or other peers) that have the desired file, instead of from one server. The P2P mode therefore does not suffer from a potential bandwidth bottleneck at a single server. However, a disadvantage with the P2P mode is that effort is involved to create and provide a P2P session for a desired file.

In contrast, certain embodiments of automatic distributed downloading can enable existing and new content on an internet to be downloaded automatically in a P2P fashion without any effort from the server. In an example embodiment, a directory service maps a uniform resource identifier (URI) corresponding to a resource to associated P2P session connection information. The P2P session connection information can be used to download the resource from a P2P network (e.g., without contacting the server originating the resource). In a specific example implementation on the client side, an aggregate downloader can combine downloads obtained from both P2P and client-server mechanisms so that the download can be completed faster. Regardless of whether aggregate downloading is specifically implemented, certain embodiments of automatic distributed downloading can enable users to download resources from an internet using P2P-based protocols without requiring additional setup or changes to the servers and without requiring additional input from users of client devices.

General embodiments, as described further herein below, are directed to downloading resources over any one or more networks using a P2P-based protocol. A user at a client can request a resource that originated on a server and that corresponds to a URI. Instead of requesting the resource from the server using the URI via a client-server-based protocol, a directory service is consulted. The directory service maps the URI to associated P2P session connection information. The client can then retrieve the resource using the P2P session connection information over a P2P network via a P2P protocol. As noted above for aggregate downloading implementations, the client can also simultaneously retrieve different portions of the requested resource from multiple different sources, including via different protocols, and then combine the portions into the requested resource.

Example Embodiments for Automatic Distributed Downloading

1: Introduction—Example Environments and General Embodiments

Figure 1:
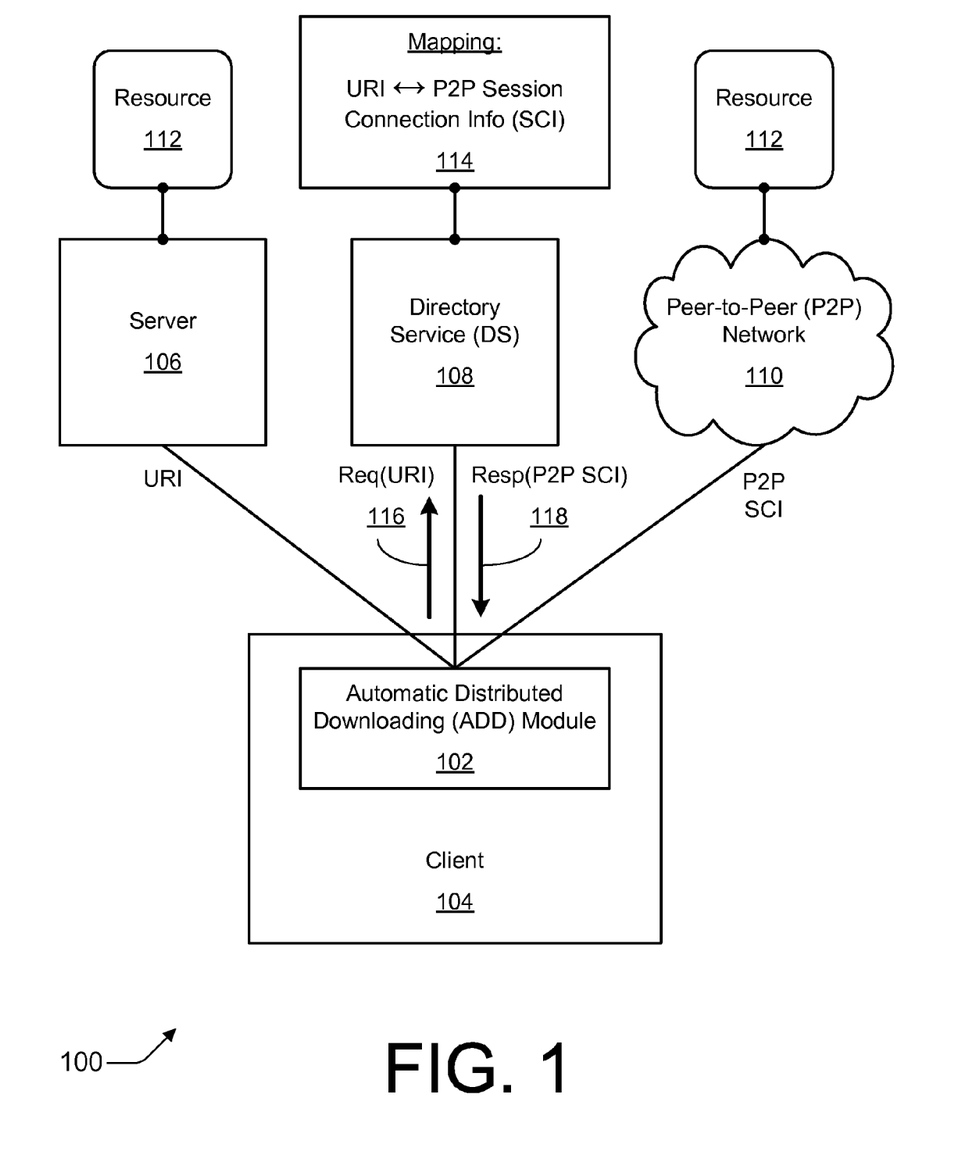
FIG. 1 is a block diagram of an example general scheme having a client, a directory service (DS), and a peer-to-peer (P2P) network for implementing automatic distributed downloading using a mapping between a uniform resource identifier (URI) and P2P session connection information (SCI).

FIG. 1 is a block diagram of an example general scheme 100 having a client 104, a directory service (DS) 108, and a peer-to-peer (P2P) network 110 for implementing automatic distributed downloading using a mapping 114 between a uniform resource identifier (URI) and P2P session connection information (SCI). As illustrated, client 104 includes an automatic distributed downloading (ADD) module 102. A server 106 originates the availability of a resource 112. After appropriate configuration (e.g., after performing a P2P session creation operation) as described herein below, P2P network 110 can also make resource 112 available.

In an example embodiment, ADD module 102 is capable of communicating with server 106, directory service 108, and/or P2P network 110 over one or more networks. If communications involve multiple networks, they may be the same or different networks for sending messages to the different network-side entities. Although not explicitly illustrated, such a network or networks can be an internet, a local area network (LAN), a wireless or wired network, one of the networks described below with reference to FIG. 8, some combination thereof, and so forth.

Server 106 and client 104 may be realized by one or more devices. Directory service 108 may also be realized with one or more devices. Although shown separately, server 106 and directory service 108 may alternatively be co-located on a single machine or set of related machines, including but not limited to when a directory service 108 covers a particular domain. An example device for implementing any of these entities is described herein below with particular reference to FIG. 8. P2P network 110 includes multiple peers and multiple P2P-type connections between and among the multiple peers in an overlay on top of one or more physical networks.

In operation of an example embodiment, a user wishes to acquire resource 112 and has knowledge of a URI corresponding thereto. The URI may be capable, for example, of uniquely identifying the corresponding resource 112 throughout one or more networks. The URI may be, by way of example but not limitation, a Uniform Resource Locator (URL), a Uniform Resource Name (URN), a Uniform Resource Citation (URC), and so forth. Without intervention by or activation of ADD module 102, client 104 would attempt to retrieve resource 112 solely from server 106 using the URI via a client-server-based protocol. Instead, ADD module 102 sends a mapping request 116 having the URI to directory service 108.

Directory service 108 accesses a mapping 114 with reference to the URI and ascertains P2P session connection information that is associated therewith. Directory service 108 sends a mapping response 118 having the P2P session connection information to ADD module 102. With the P2P session connection information, ADD module 102, possibly in conjunction with another component of client 104, can retrieve resource 112 over P2P network 110 via a P2P protocol.

Client 104 can access resource 112 from server 106 using the URI via a client-server-based protocol. After a request/response exchange with directory service 108, ADD module 102 possesses the P2P session connection information enabling client 104 to also access resource 112 from P2P network 110 via a P2P-based protocol. Examples of resource 112 include, but are not limited to, a file, a program, a plug-in, a media stream, some combination thereof, and so forth.

2: Example Specific Embodiments

Figure 2:
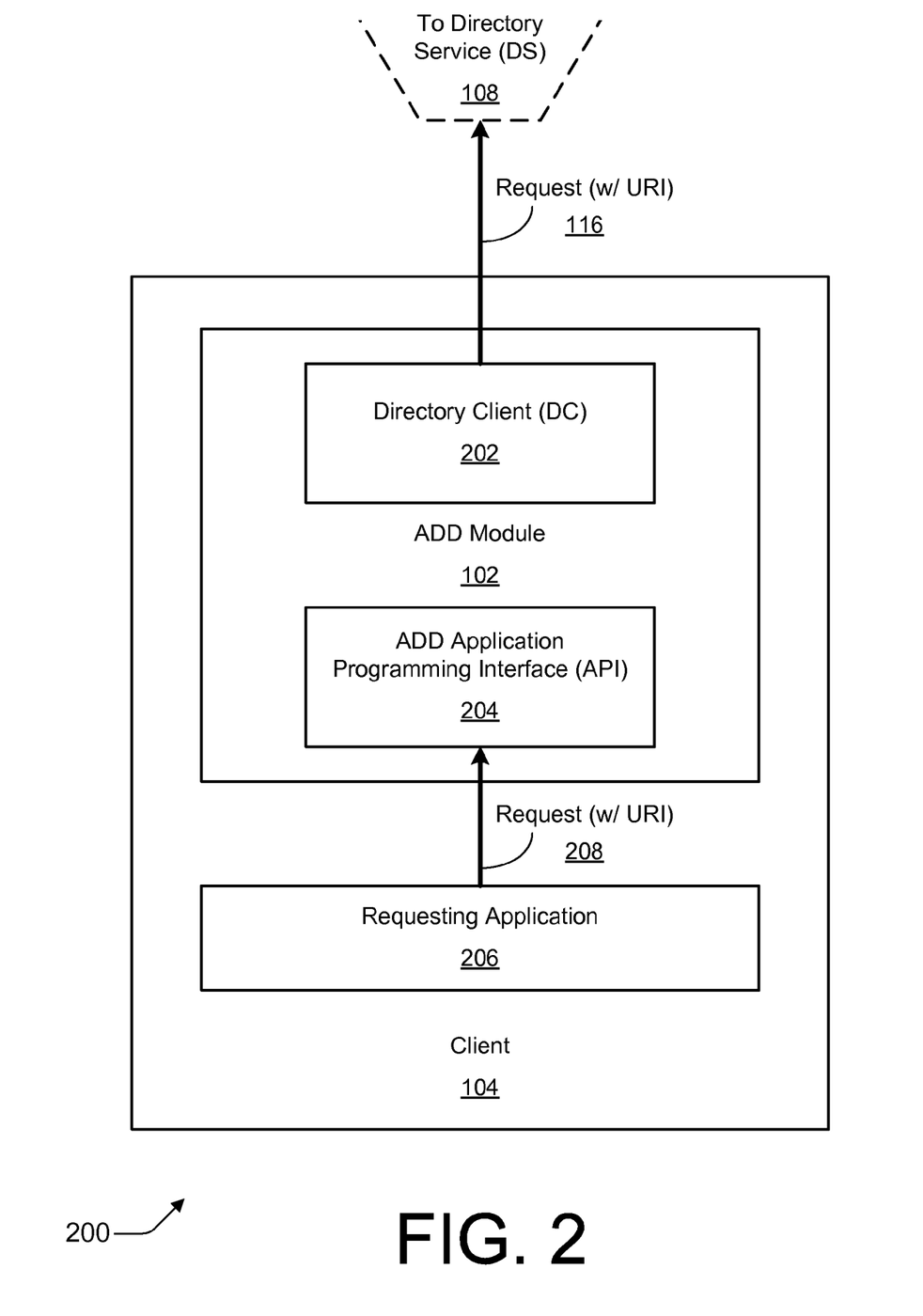
FIG. 2 is a block diagram of a client that includes an example automatic distributed downloading (ADD) module to make a mapping request.

FIG. 2 is a block diagram 200 of a client 104 that includes an example ADD module 102 to make a mapping request 116. As illustrated, ADD module 102 includes an ADD application programming interface (API) 204 and a directory client (DC) 202. In addition to ADD module 102, client 104 includes a requesting application 206. Requesting application 206 may be, by way of example but not limitation, a browser, a download manager, an application generally, an operating system component, a combination thereof, and so forth.

In an example embodiment, ADD module 102 provides a downloading service this is accessible to requesting applications via an exposed API. ADD API 204 may be realized using a library of functions, an application module, some combination thereof, and so forth. Directory client 202 facilitates communication between ADD module 102 and directory service 108. In operation, a requesting application 206 makes a resource request 208 having a URI to ADD module 102 via ADD API 204. Resource request 208 is directed toward a targeted resource 112. As a result of accepting resource request 208, directory client 202 sends mapping request 116 having the URI to directory service 108.

Figure 3:
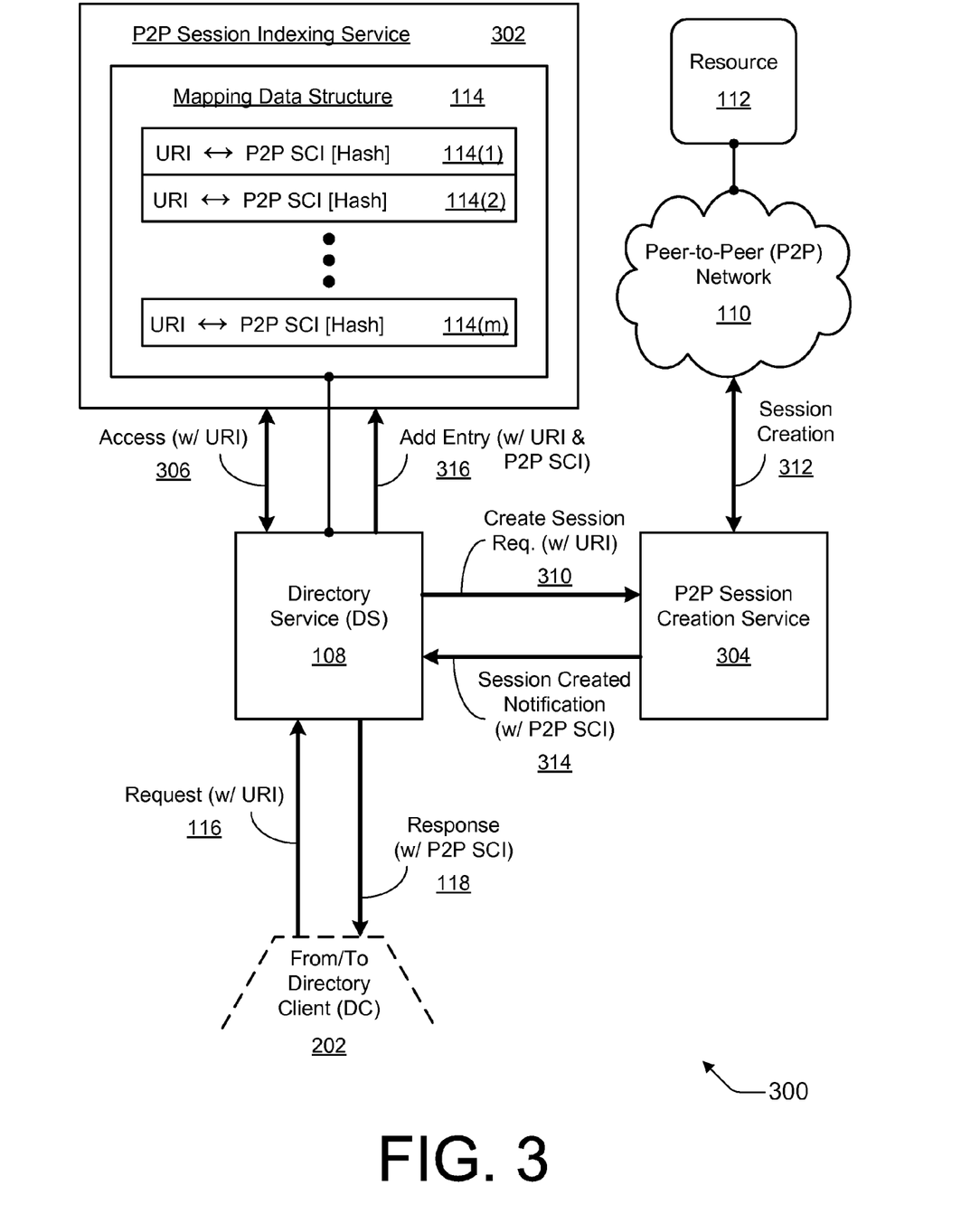
FIG. 3 is a block diagram of an example directory service and other network-side entities to process and respond to the mapping request.

FIG. 3 is a block diagram 300 of directory service 108 and other example network-side entities to process and respond to mapping request 116. As illustrated, block diagram 300 includes a P2P session indexing service 302, a P2P session creation service 304, and various communication messages, events, and/or operations 306-316. P2P session indexing service 302 includes mapping data structure 114. Mapping request 116 having the URI that corresponds to resource 112 is sent from directory client 202 to directory service 108.

In an example embodiment, directory service 108 receives mapping request 116 having the URI from directory client 202. P2P session indexing service 302 is accessible to directory service 108. Directory service 108 contacts P2P session indexing service 302 and accesses mapping data structure 114. This access operation 306 references the URI corresponding to resource 112. Depending on implementation, P2P session indexing service 302 and/or mapping data structure 114 may be separate from or part of directory service 108.

Mapping data structure 114 includes multiple mapping entries 114(1), 114(2) . . . 114(m), with "m" representing an integer. Each respective mapping entry 114(x) associates a respective URI with respective P2P session connection information. In other words, each mapping entry 114(x) maps a key (the URI) to data (the P2P session connection information). Each mapping entry 114(x) may also include a hash (e.g., a cryptographic hash) value that derives from the corresponding resource 112. Client 104 can verify the accuracy and completeness of a downloaded resource by comparing a hash value computed from the downloaded resource to the hash value stored in the corresponding mapping entry 114(x) and sent to directory client 202.

After a mapping entry 114(x) having the corresponding URI is located in mapping data structure 114, the associated P2P session connection information is extracted. Hence, after mapping data structure access operation 306, directory service 108 possesses the P2P session connection information that is associated with the received URI. Directory service 108 formulates and then sends a mapping response 118 having the P2P session connection information to directory client 202. Utilization of the received P2P session connection information at client 104 is described herein below with particular reference to FIG. 4.

P2P session connection information comprises information that enables an entity (e.g., client 104) to connect to a P2P session and download a targeted resource. Consequently, the contents of a P2P session connection information package may be P2P protocol specific. By way of example only, for a BitTorrent P2P protocol, a separate BitTorrent file is downloaded and used to download the targeted resource.

When directory service 108 accesses 306 mapping data structure 114 with reference to the URI, it is possible that no mapping entry 114(x) includes the referenced URI. In other words, there may be no known P2P session connection information that is associated with the referenced URI and that enables P2P-protocol-based retrieval of the resource corresponding thereto. If so, directory service 108 sends a mapping response 118 that includes a negative indicator or result, which indicates that no P2P session connection information is known for the requested URI. Also in such cases for an example embodiment, directory service 108 sends a create session request 310 with the URI to P2P session creation service 304. Although illustrated separately in FIG. 3, P2P session creation service 304 and directory service 108 may alternatively be co-located.

P2P session creation service 304 receives create session request 310 having the URI from directory service 108. P2P session creation service 304 creates a P2P session at session creation event 312. The created P2P session enables the corresponding resource 112 to be downloaded over P2P network 110 via a P2P-based protocol. This session creation event 312 produces appropriate P2P session connection information for retrieving resource 112 over P2P network 110 via a P2P-based protocol. P2P session connection information provides data that can be used to hook into a P2P session offering resource 112. P2P session creation service 304 sends a session created notification 314 having the P2P session connection information to directory service 108. Session created notification 314 may also include a hash value of resource 312 as it is accessible over P2P network 110 when P2P session creation service 304 computes the hash.

Directory service 108 receives session created notification 314 having the P2P session connection information from P2P session creation service 304. Directory service 108 sends an add entry instruction 316 to P2P session indexing service 302. Add entry instruction 316 includes the URI (including at least a reference thereto) and the P2P session connection information. P2P session indexing service 302 adds a new mapping entry 114(x) to mapping data structure 114. The new mapping entry 114(x) associates the URI with the P2P session connection information. The new mapping entry 114(x) may also include a hash value created (e.g., by directory service 108, P2P session creation service 304, P2P session indexing service 302, etc.) responsive to the corresponding resource 112 in accordance with some hashing algorithm.

After directory service 108 receives session created notification 314 having the P2P session connection information from P2P session creation service 304, directory service 108 may send a mapping response 118 having the P2P session connection information to directory client 202. Potentially, however, too much time might have elapsed for the first-requesting client 104 to directly benefit from the created P2P session for resource 112. With regard to message communication timings, when directory service 108 ascertains that P2P session indexing service 302 does not have an entry for a requested URI, directory service 108 can send a negative response to directory client 202.

Alternatively or additionally, directory service 108 can send P2P session connection information to directory client 202 after its creation so that directory client 202 can choose to retrieve resource 112 using the URI via a client-server-based protocol and/or to retrieve it using the P2P session connection information via a P2P-based protocol. This is an especially viable alternative if P2P session connection information can be received at the client prior to a complete downloading of resource 112 via the server-client-based protocol. As described further herein below with particular reference to an aggregate downloader embodiment of FIG. 7, resource 112 can also be downloaded using both download mechanisms, with the retrieved chunks of resource 112 being combined at client 104.

Figure 4:
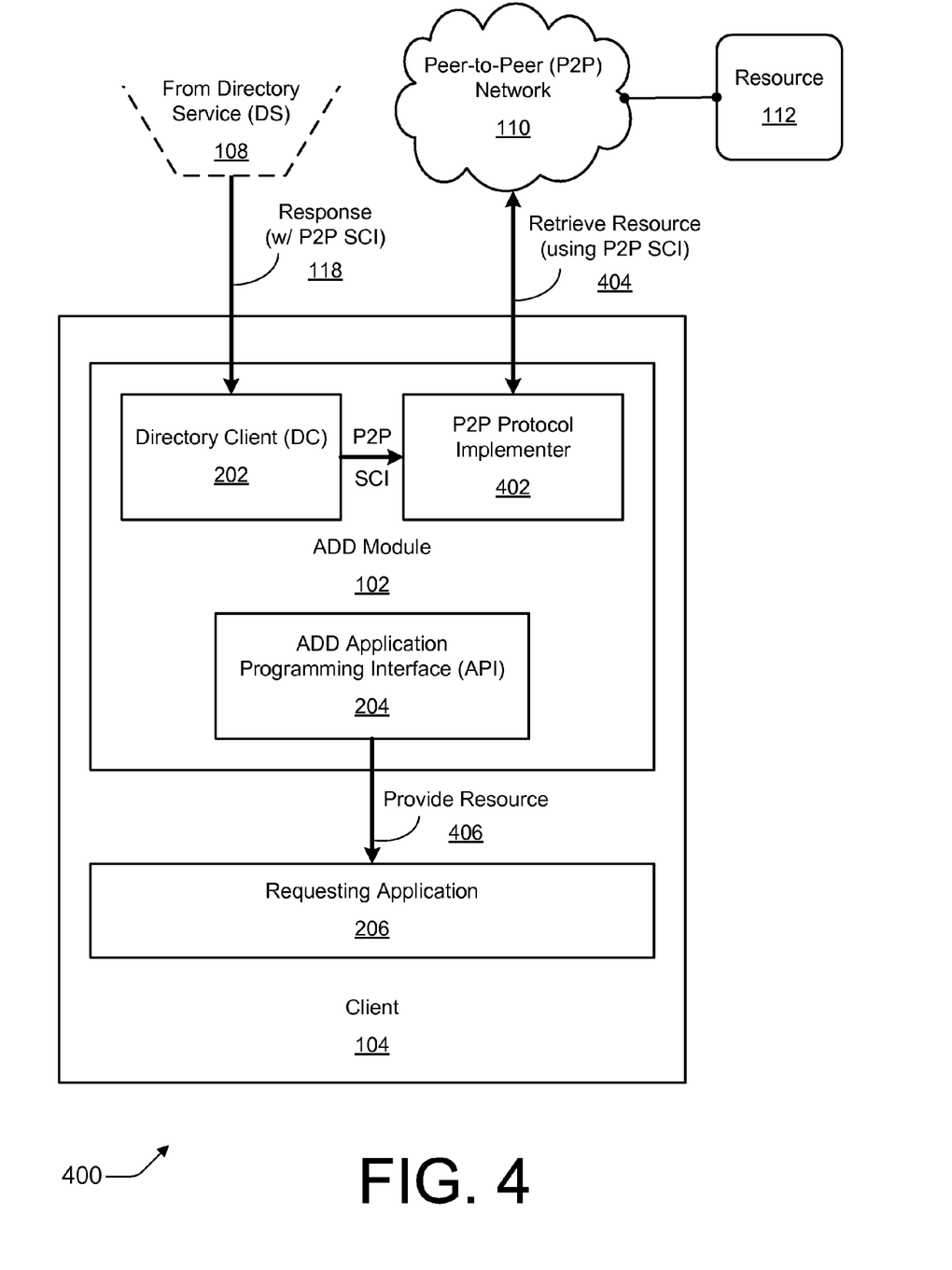
FIG. 4 is a block diagram of the client including the example ADD module to utilize a response to the mapping request to retrieve a resource.

FIG. 4 is a block diagram 400 of client 104 including example ADD module 102 to utilize a response 118 to the mapping request to retrieve resource 112. As illustrated, ADD module 102 includes a P2P protocol implementer 402. Alternatively, all or part of P2P protocol implementer 402 may reside on client 104 separately from ADD module 102.

In an example embodiment, directory client 202 receives mapping response 118 having the P2P session connection information from directory service 108. Mapping response 118 may also include a hash computed on resource 112. Directory client 202 forwards the P2P session connection information to P2P protocol implementer 402.

Using the P2P session connection information, P2P protocol implementer 402 retrieves 404 resource 112 in accordance with the established P2P session. More specifically, P2P protocol implementer 402 performs resource retrieval operation 404 for resource 112 over P2P network 110 via a P2P-based protocol. P2P protocol implementer 402 is capable of operating in accordance with one or more defined P2P protocols.

ADD module 102 may verify the integrity and/or accuracy of the retrieved resource 112 using a hash value received (e.g., separately or as part of mapping response 118) from directory service 108. If the verification procedure fails, ADD module 102 may still retrieve resource 112 from server 106 (of FIG. 1) using the URI via a client-server-based protocol. After verification (if any), ADD API 204 provides 406 the downloaded resource 112 to requesting application 206.

Figure 5:
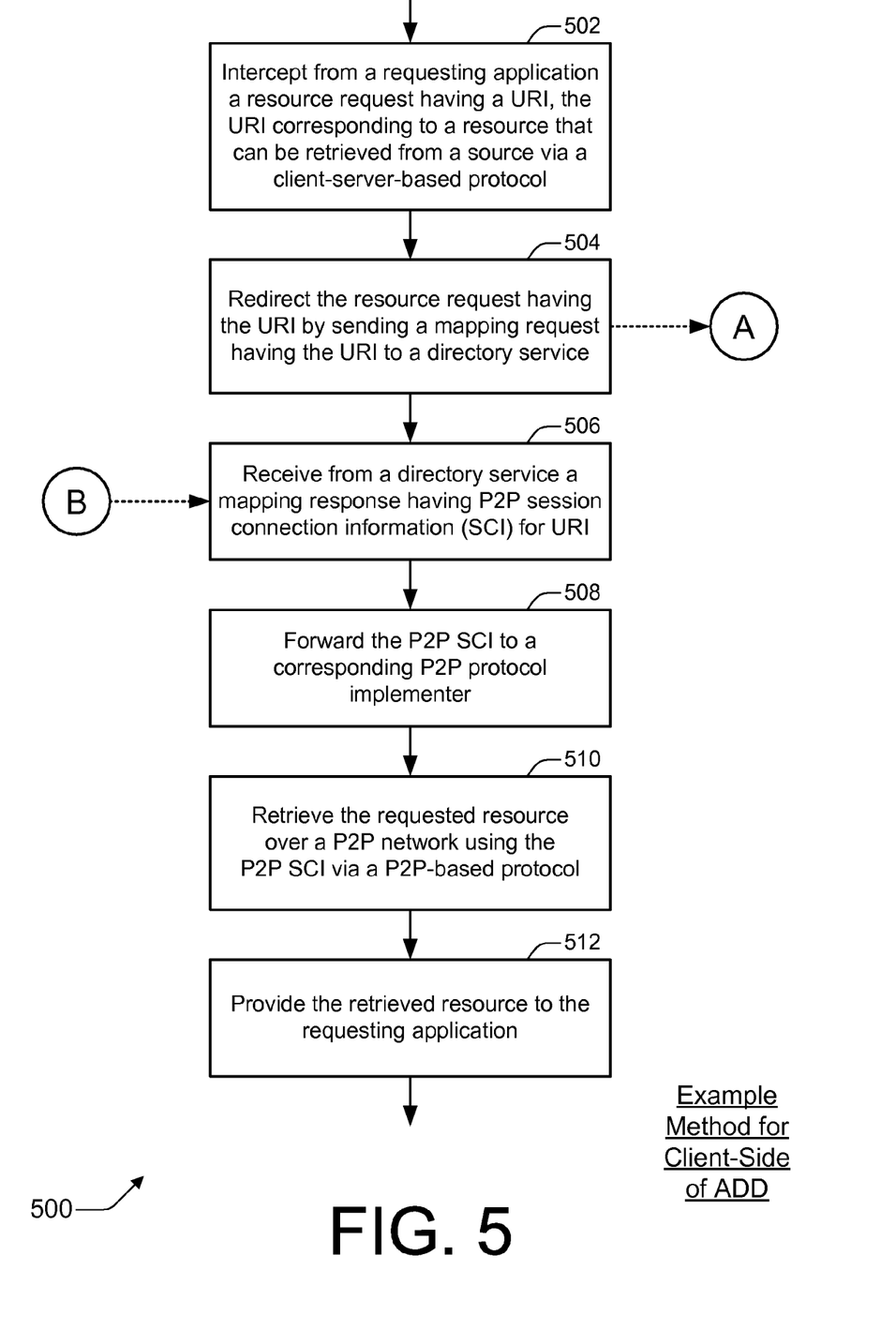
FIG. 5 is a flow diagram that illustrates an example of a method for implementing client-side automatic distributed downloading.
Figure 6:
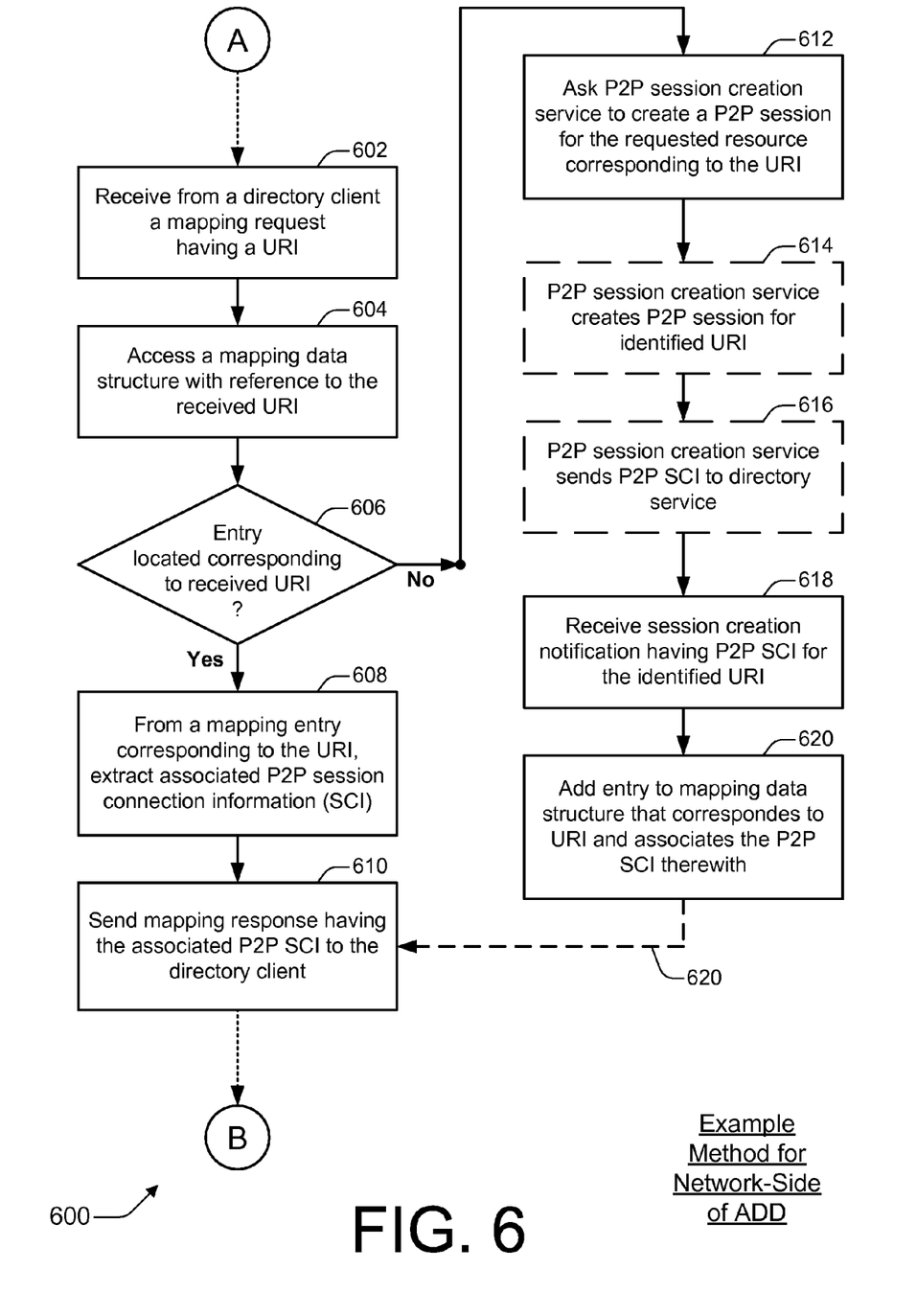
FIG. 6 is a flow diagram that illustrates an example of a method for implementing network-side automatic distributed downloading.

In the drawings, FIGS. 5 and 6 are flow diagrams 500 and 600, respectively. Implementations of flow diagrams 500 and 600 may be realized, for example, as processor-executable instructions. Processor-executable instructions may be embodied as software, firmware, hardware, fixed logic circuitry, some combination thereof, and so forth. The acts of these flow diagrams may be performed in many different environments, with a number of different devices, and/or in a variety of different network configurations. Hence, although the descriptions of certain blocks and the acts thereof reference other elements that are described herein, they do so by way of example only. The order in which the methods are described is not intended to be construed as a limitation, and any number of the described blocks can be combined, augmented, rearranged, and/or omitted to implement a respective method, or an alternative method that is equivalent thereto.

FIG. 5 is a flow diagram 500 that illustrates an example of a method for implementing client-side automatic distributed downloading. Flow diagram 500 includes six (6) blocks 502-512. In an example embodiment, at block 502, a resource request having a URI is intercepted from a requesting application, with the URI corresponding to a resource that can be retrieved from a source via a client-server-based protocol. For example, an ADD API 204 of an ADD module 102 may receive a resource request 208 having a URI from a requesting application 206, with the URI corresponding to a retrieval of a resource 112 from a server 106 via a client-server-based protocol.

At block 504, the resource request having the URI is redirected by sending a mapping request having the URI to a directory service. For example, a directory client 202 of ADD module 102 may send a mapping request 116 having the URI to a directory service 108. As indicated by the encircled "A", which leads to flow diagram 600 of FIG. 6, network-side acts may process the mapping request.

As indicated by the encircled "B", which comes from flow diagram 600 of FIG. 6, network-side acts may return a response to the mapping request. At block 506, a mapping response having P2P session connection information for the identified URI may be received from a directory service. For example, directory client 202 may receive from directory service 108 mapping response 118 having P2P session connection information for the identified URI.

At block 508, the P2P session connection information is forwarded to a corresponding P2P protocol implementer. For example, directory client 202 may forward the P2P session connection information to a P2P protocol implementer 402 that corresponds to the P2P session described by the P2P session connection information.

At block 510, the requested resource is retrieved over a P2P network using the P2P session connection information via a P2P-based protocol. For example, P2P protocol implementer 402 may perform a resource retrieval operation 404 using the P2P session connection information to thereby acquire resource 112 from P2P network 110 via a P2P-based protocol.

At block 512, the retrieved resource is provided to the requesting application. For example, ADD API 204 may provide 406 the retrieved resource 112 to requesting application 206.

FIG. 6 is a flow diagram 600 that illustrates an example of a method for implementing network-side automatic distributed downloading. Flow diagram 600 includes ten (10) blocks 602-620. In an example embodiment, at block 602, a mapping request having a URI is received from a directory client. For example, a mapping request 116 having a URI may be received from a directory client 202 at a directory service 108.

At block 604, a mapping data structure is accessed with reference to the received URI. For example, directory service 108 may attempt an access 306 with reference to the identified URI on a mapping data structure 114 of a P2P session indexing service 302.

At block 606, it is ascertained if an entry is located that corresponds to the received URI. For example, it may be ascertained (e.g., by P2P session indexing service 302 and/or directory service 108) if mapping data structure 114 includes a mapping entry 114(x) that corresponds to the identified URI. If not, then the method of flow diagram 600 continues at block 612, which is described below. On the other hand, if a mapping entry 114(x) corresponding to the identified URI is located, then the method continues at block 608.

At block 608, from a mapping entry corresponding to the received URI, associated P2P session connection information (SCI) is extracted. For example, at a mapping entry 114(x) corresponding to the identified URI, the associated P2P session connection information may be extracted. A hash value computed on resource 112 may also be extracted.

At block 610, a mapping response having the associated P2P session connection information is sent to the directory client. For example, a mapping response 118 having the P2P session connection information may be sent from directory service 108 to directory client 202. Mapping response 118, or another message, may include any extracted hash value.

The acts of blocks 612-620 address example scenarios for when a mapping entry corresponding to the identified URI is not located within a mapping data structure. At block 612, a P2P session creation service is asked (e.g., by a directory service) to create a P2P session for the requested resource corresponding to the URI. For example, directory service 108 may send a create session request 310 having the identified URI to a P2P session creation service 304.

The acts of blocks 614 and 616 may be performed by, for example, a P2P session creation service. At block 614, the P2P session creation service creates a P2P session for the identified URI, with the P2P session associated with P2P session connection information. For example, P2P session creation service 304 may perform a session creation operation 312 that makes resource 112 corresponding to the identified URI available over P2P network 110 via a P2P-based protocol using P2P session connection information. The session creation operation 312 produces the P2P session connection information.

At block 616, the P2P session creation service sends P2P session connection information to the directory service. For example, P2P session creation service 304 may send a session created notification 314 that includes the P2P session connection information to directory service 108.

At block 618, a session creation notification having P2P session connection information for the identified URI is received. For example, directory service 108 may receive session created notification 314 that includes the P2P session connection information from P2P session creation service 304.

At block 620, an entry, which corresponds to the identified URI and associates the P2P session connection information therewith, is added to the mapping data structure. For example, directory service 108 may perform an add entry operation 316 to add a mapping entry 114(x) that associates the identified URI with the P2P session connection information that is produced by the session creation operation 312.

As indicated by arrow 620, if the P2P session connection information is potentially still relevant to the requesting directory client 202, P2P session connection information that is recently-produced from a session creation operation may be sent from the network side (e.g., from directory service 108) to the requesting directory client 202. Although not explicitly illustrated in FIG. 6, after a "no" result at block 606, the network side (e.g., directory service 108) may send a negative mapping response 118 to the requesting directory client 202. Thus, directory client 202 can begin to download the targeted resource 112 using the URI from server 106 via a client-server-based protocol.

3: Example Alternative Embodiments

This section describes additional example alternative embodiments. An initial portion references FIG. 7 to describe example aggregate downloader implementations. Subsequent portions reference other FIGS. and elements thereof to describe other alternative embodiments.

Figure 7:
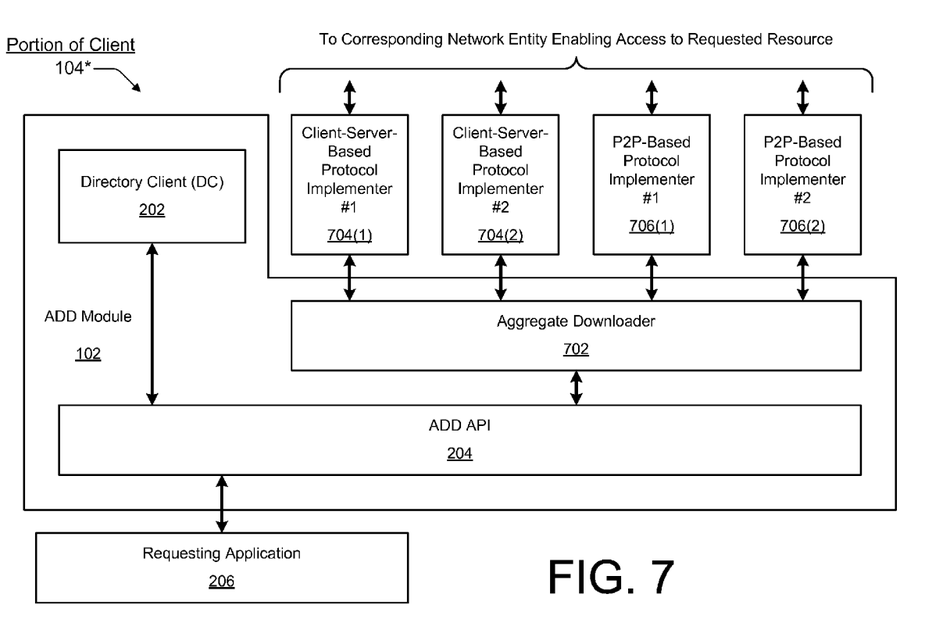
FIG. 7 is a block diagram of a client portion having an ADD module that includes an example aggregate downloader.

FIG. 7 is a block diagram of a client portion 104* having an ADD module 102 that includes an example aggregate downloader 702. As illustrated, aggregate downloader 702 is included as part of ADD module 102. Alternatively, aggregate downloader 702 may be a companion module to ADD module 102. Four protocol implementers 704 and 706 are also included as part of client portion 104*. These protocol implementers 704 and 706 may correspond to multiple P2P protocol implementers 402 (of FIG. 4). Although not so illustrated, all or part of any of these protocol implementers 704 and 706 may be realized as part of ADD module 102 and/or as part of aggregate downloader 702. Although four protocol implementers 704 and 706 are explicitly illustrated in FIG. 7, there may alternatively be fewer or more than four.

In an example general embodiment, aggregate downloader 702 is capable of downloading an identified resource 112 (not shown in FIG. 7) using two or more different protocol implementers 704/706, including potentially fully or partially simultaneously. Consequently, aggregate downloader 702 may download from two or more different sources (e.g., server(s) 106, P2P network(s) 110, etc.). Especially when the downloading is performed at least partially in parallel, the total downloading time may be lower than using any single source. After the resource is downloaded in chunks, aggregate downloader 702 combines the chunks into a whole resource so that ADD API 204 can provide it to requesting application 206.

In client portion 104*, two client-server-based protocol implementers 704 and two P2P-based protocol implementers 706 are illustrated. More specifically, a first client-server-based protocol implementer #1 704(1) and a second client-server-based protocol implementer #2 704(2) are illustrated. A first P2P-based protocol implementer #1 706(1) and a second P2P-based protocol implementer #2 706(2) are illustrated. Other different types of protocol implementers may also be used in conjunction with aggregate downloader 702.

Each respective protocol implementer 704/706 enables access to a requested resource from a corresponding network entity via a respective corresponding protocol. Examples of network entities include, by way of example but not limitation, servers 106, P2P networks 110 (both of FIG. 1), and so forth. By way of example only, second client-server-based protocol implementer #2 704(2) may be capable of retrieving resource 112 from server 106 via a client-server-based protocol, and first P2P-based protocol implementer #1 706(1) may be capable of retrieving resource 112 from P2P network 110 via a P2P-based protocol.

In an example specific embodiment, aggregate downloader 702 chooses which source or combination of sources to use to download a requested resource 112. In this example, two sources are chosen. Aggregate downloader 702 separates resource 112 into multiple chunks and assigns respective sets of chunks to respective protocol implementers 704(2) and 706(1). Thus, second client-server-based protocol implementer #2 704(2) downloads its assigned set of chunks from server 106 via the client-server-based protocol, and first P2P-based protocol implementer #1 706(1) downloads its assigned set of chunks from P2P network 110 via the P2P-based protocol.

These implementations may be protocol specific. The client-server-based HTTP protocol, for example, enables range requests to be made when retrieving a resource 112 such that the chunks may be so delimited. Examples of client-server-based protocols include, but are not limited to, HTTP, Hypertext Transfer Protocol Secure (HTTPS), File Transfer Protocol (FTP), and so forth. Examples of P2P-based protocols include, but are not limited to, Kazaa, Napster, BitTorrent, and so forth.

Aggregate downloader 702 can also verify the integrity and/or accuracy of the resulting combined resource 112 after downloading using a hash value received from directory service 108. If the verification fails, aggregate downloader 702 can re-download resource 112 from different source(s), including from the single originating source. This verification using the hash value can be performed, by way of example only, when one or more of the sources and/or downloading protocol mechanisms that are utilized cannot be fully trusted.

In an example embodiment, ADD API 204 is asked to download a requested URI. ADD API 204 starts an instance of aggregate downloader 702 with the requested URI. Concurrently, directory client 202 asks directory service(s) 108 that are attained from a list thereof for a new source from which to better download the targeted resource 112. If no other source is ascertained, aggregate downloader 702 continues downloading exclusively from the requested URI. On the other hand, if directory client 202 receives a new source (or sources), this new source is added to the instance of aggregate downloader 702. Hence, aggregate downloader 702 additionally downloads from the new source. If directory client 202 was used to obtain a new source and if the resulting file combined by aggregate downloader 702 does not have a cryptographic hash matching that obtained from directory service 108, the download is failed, so the file is deleted. In this case, the file is re-downloaded from the original URI without trying to access a directory service 108.

For an example implementation, aggregate downloader 702 can support the addition of new sources even after initial configuration. In other words, while downloading from one set of sources, more sources may be added. Aggregate downloader 702 may manage its child protocol instances by keeping a cache file of the combined progress, by providing suggestions to the child protocols of what chunks to download, and by providing access to the cached combined progress to any of the child protocols if they request it.

With reference to FIG. 2, for an example embodiment, directory client 202 may make mapping request 116 by performing a GET on the resource for the well known URI while including a query containing a copy of the requested URI. The mapping request may also include a list of supported communication protocols and a list of supported cryptographic hashing algorithms. Accordingly, directory service 108 can tailor its mapping response 118 to those protocols and hashing algorithms that are supported by the client.

With reference to FIGS. 2 and 3, for another example embodiment, directory client 202 may have a listing of multiple directory services 108. If so, directory client 202 may try each of them sequentially or in parallel in an attempt to get a faster response and/or a different response (e.g., one for a supported P2P-based protocol).

With continuing reference to FIG. 3, for another example embodiment, a directory service 108 may return multiple P2P session connection information packages in response to a single URI. They may be grouped randomly or grouped hierarchically as primary, secondary, tertiary, etc. recommended P2P options, and so forth. Moreover, a directory service 108 may return one or more alternative URIs in a mapping response for a mapping request from a directory client 202. The receiving directory client 202 can then also choose to download a targeted resource from one or more of these alternative URIs, especially with an implementation that includes an aggregate downloader 702.

With continuing reference to FIG. 3, for another example embodiment, when a mapping entry 114($x$) is added to P2P session indexing service 302 from P2P session creation service 304, directory service 108 can also store whatever caching information is applicable to determining whether or not a proxy can serve cached information. If a mapping request 116 is made for a resource and a mapping entry 114($x$) exists but the caching information suggests that the cached version may be out of date, then that mapping entry 114($x$) is removed and not returned to directory client 202.

With continuing reference to FIG. 3, for another example embodiment, directory service 108 may allow clients 104 to register a mapping 114 from a client-provided key (URI) to client-provided data (P2P session connection information). Directory service 108 may disallow the registration by directory client 202 if the service cannot verify that the resource obtained from the data matches the resource obtained from the key or if the service cannot verify that the key is uniformly accessible. Directory service 108 can also follow the proxy or caching rules if such rules exist for any protocol associated with the key.

The following description pertains to a specific example in which an HTTP protocol is used for the message exchange for mapping request 116 and mapping response 118 and in which the P2P protocol corresponds to the BitTorrent protocol. However, these messages and protocols may be implemented in alternative fashions. If a directory service has a mapping for a requested URI to other sources that use protocols supported by the client, then the service responds with "200" and the mapped sources in the HTTP response body. If no such mapping exists, the service responds with "404". When a directory service requests a BitTorrent session creation service to create a new P2P session, the BitTorrent session creation service creates a torrent file for the resource identified by the requested URI, hosts that file on a server, starts a BitTorrent tracker that is specified by the torrent file, and sends back to the directory service a torrent identifier. The torrent identifier specifies the location of the torrent file, the cryptographic hash used in the torrent file, and any caching information associated with the requested URI.

Example Device Implementations for Automatic Distributed Downloading

Figure 8:
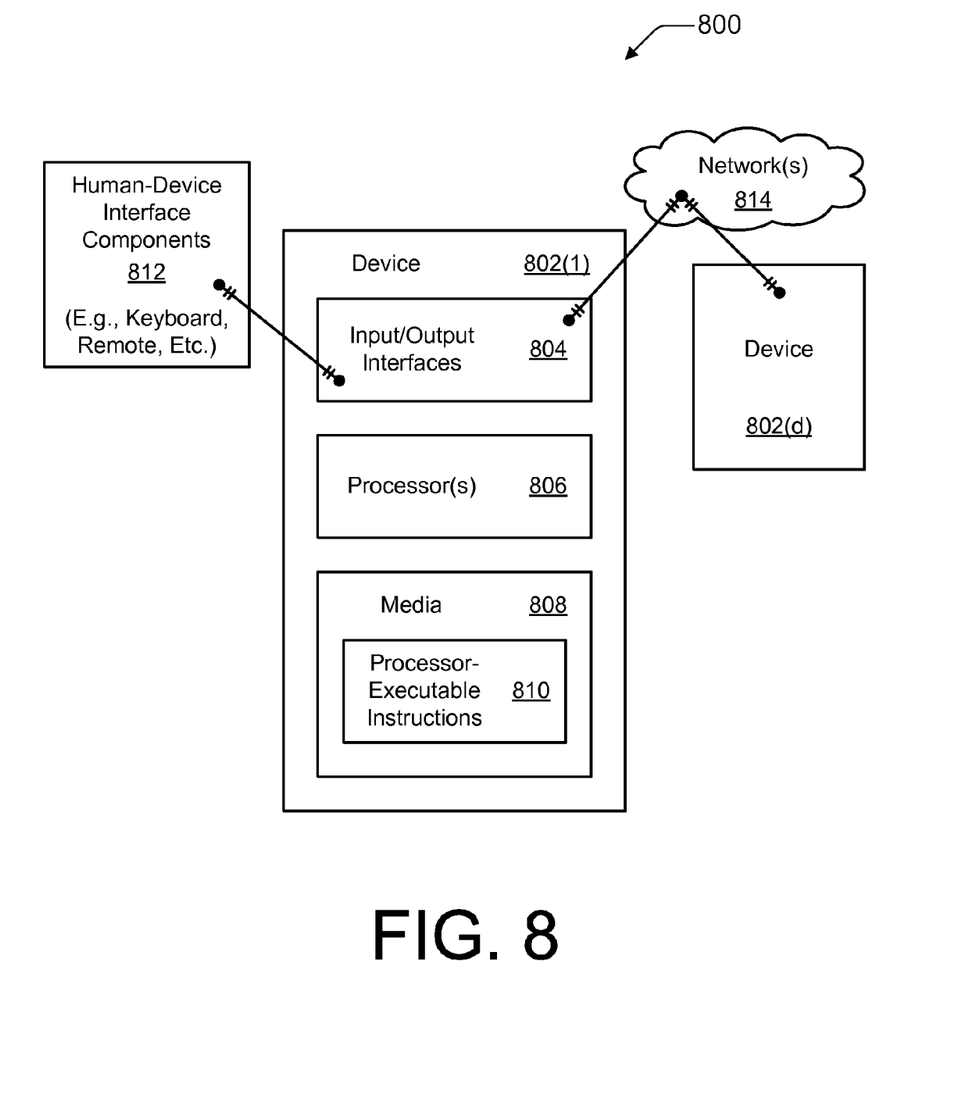
FIG. 8 is a block diagram of an example device that may be used to implement automatic distributed downloading.

FIG. 8 is a block diagram 800 of an example device 802 that may be used to implement automatic distributed downloading. Clients 104, directory services 108, etc. (each of FIG. 1) may be realized as devices 802. As illustrated, two devices 802(1) and 802(d), with "d" representing an integer, are capable of engaging in communications via network(s) 814. Although two devices 802 are specifically shown, one or more than two devices 802 may be employed, depending on implementation. Network(s) 814 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth. Alternatively, two devices 802 may be directly connected.

Generally, a device 802 may represent any computer or processing-capable device, such as a server, a desktop, a notebook, etc. computer; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 802 includes one or more input/output (I/O) interfaces 804, at least one processor 806, and one or more media 808. Media 808 include processor-executable instructions 810.

In an example embodiment of device 802, I/O interfaces 804 may include (i) a network interface for communicating across network 814, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface components 812 (e.g., a keyboard, a remote, a mouse or other graphical pointing device, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802. Processor-executable instructions may be embodied as software, firmware, hardware, fixed logic circuitry, some combination thereof, and so forth.

Thus, realizations for automatic distributed downloading may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 808 may be any available media that is included as part of and/or accessible by device 802. It includes volatile and non-volatile media, removable and non-removable media, storage and transmission media (e.g., wireless or wired communication channels), hard-coded logic media, combinations thereof, and so forth. Media 808 is tangible media when it is embodied as a manufacture and/or as a composition of matter. For example, media 808 may include an array of disks or flash memory for longer-term mass storage of processor-executable instructions 810, random access memory (RAM) for shorter-term storing of instructions that are currently being executed and/or otherwise processed, link(s) on network 814 for transmitting communications, and so forth.

As specifically illustrated, media 808 comprises at least processor-executable instructions 810. Generally, processor-executable instructions 810, when executed by processor 806, enable device 802 to perform the various functions described herein. Such functions include, but are not limited to: (i) those acts that are illustrated in flow diagrams 500 and 600 (of FIGS. 5 and 6, respectively); (ii) those that are illustrated in the different described schemes of FIGS. 1-4 and 7; those of other algorithms described herein; combinations thereof; and so forth.

The devices, acts, aspects, features, functions, procedures, modules, data structures, techniques, components, parts, etc. of FIGS. 1-8 are illustrated in diagrams that are divided into multiple blocks and other elements. However, the order, interconnections, interrelationships, layout, etc. in which FIGS. 1-8 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for automatic distributed downloading.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device comprising:
one or more processors;
an automatic distributed downloading module to facilitate resource downloads over one or more networks, the automatic distributed downloading module comprising:
an automatic distributed downloading application programming interface (API) to:
receive a resource request including a uniform resource identifier (URI) that corresponds to a targeted resource; and
initiate retrieval of at least a portion of the targeted resource using the URI;
a directory client to communicate with at least one directory service; the directory client to send to the at least one directory service a mapping request including the URI, and the directory client to receive from the at least one directory service a mapping response including peer-to-peer session connection information, the directory client being further configured to perform the communicate, send, and receive actions concurrently with the retrieval of the at least a portion of the targeted resource by the API; and
an aggregate downloader configured to:
create, as an initial configuration, multiple sessions with multiple sources of the targeted resource indicated by the mapping, the multiple sources including one or more peer-to-peer sources and one or more client-server sources by at least creating multiple protocol implementers each corresponding to one of the multiple sources indicated by the mapping;
coordinate downloading of the targeted resource using the multiple sessions and corresponding protocol implementers such that different portions of the targeted resource are assigned to different protocol implementers and downloaded simultaneously;
after the initial configuration and during the coordinated downloading of the targeted resource, add one or more new sources to the coordinated downloading of the targeted resource in response to the one or more new sources being identified by the directory client;
aggregate portions of the targeted resource obtained using the multiple sessions and the one or more new sources;
upon detection that one or more peer-to-peer sources for the targeted resource are not listed in the mapping response, invoke a session creation service to produce session connection information for retrieving the targeted resource from one or more peer-to-peer sources and create a mapping entry for the targeted resource that enables portions of the targeted resources to be downloaded by the directory client of the device via the one or more peer-to-peer sources;
based on a comparison of a received hash value associated with the URI to a computed hash value associated with the aggregated portions of the targeted resource, obtain the targeted resource directly from the one or more client-server sources using the URI when the received hash value does not match the computed hash value; and
a peer-to-peer protocol implementer to retrieve at least a portion of the targeted resource over a peer-to-peer network using the peer-to-peer session connection information.

2. The device as recited in claim 1, wherein the directory client is to forward the peer-to-peer session connection information to the peer-to-peer protocol implementer; and wherein at least a portion of the peer-to-peer protocol implementer is part of the automatic distributed downloading module.

3. The device as recited in claim 1, wherein the peer-to-peer protocol implementer is to retrieve the portion of the targeted resource from the peer-to-peer network via a peer-to-peer-based protocol; and wherein the URI corresponds to a source comprising at least one server that makes the targeted resource available via a client-server-based protocol.

4. The device as recited in claim 1, further comprising:
a requesting application to communicate with the automatic distributed downloading module via the automatic distributed downloading API;
wherein the automatic distributed downloading API is to receive the resource request from the requesting application and is to provide the retrieved targeted resource to the requesting application.

5. The device as recited in claim 1, wherein the aggregate downloader is further configured to download chunks of an identified resource from the multiple sources and to combine the downloaded chunks to form the targeted resource.

6. The device as recited in claim 5, wherein:
the aggregate downloader is to download chunks of the identified resource from the multiple sources via multiple different communication protocols;
the device further comprises a client-server protocol implementer to retrieve from a server corresponding to the URI chunks of the identified resource via a client-server-based protocol;
the peer-to-peer protocol implementer is to retrieve from a peer-to-peer network chunks of the identified resource via a peer-to-peer-based protocol using the peer-to-peer session connection information; and
the aggregate downloader at least partially controls operation of the client-server protocol implementer and the peer-to-peer protocol implementer.

7. A method for facilitating automatic distributed downloading, the method comprising:
receiving a mapping request from a requesting client including a uniform resource identifier (URI) that corresponds (i) to a targeted resource and (ii) to a source, the source making the targeted resource available via a client-server-based protocol;
accessing a mapping data structure with reference to the URI;
ascertaining if the mapping data structure includes a mapping entry corresponding to the URI that is usable by the requesting client to obtain the targeted resource, the requesting client being configured to initiate retrieval of the targeted resource from the source via the clientserver-based protocol concurrently with the receiving, accessing, and ascertaining operations;

if the mapping data structure is ascertained to include a mapping entry corresponding to the URI, extracting peer-to-peer session connection information that is associated with the URI from the ascertained mapping entry, the peer-to-peer session connection information enabling connection to a peer-to-peer session that makes the targeted resource available via a peer-to-peer-based protocol;

extracting from the ascertained mapping entry a hash value associated with the URI and corresponding to the targeted resource;

sending a mapping response including the peer-to-peer session connection information in response to the act of receiving the mapping request, the mapping response being usable by the requesting client to coordinate downloading of the targeted resource from multiple sources, the coordinated downloading including establishment of an initial configuration of the multiple sources using the client-server-based protocol and the peer-to-peer session connection information, the mapping response including the extracted hash value, the extracted hash value being usable by the requesting client to determine whether to retrieve the targeted resource from the source via the client-server-based protocol if the extracted hash value does not match a computed hash value; and after sending the mapping response, sending connection information associated with one or more additional sources of the targeted resource to the requesting client to enable the client device to add the one or more additional sources to the coordinated downloading of the targeted resource after the initial configuration;

if the mapping data structure is ascertained not to include a mapping entry corresponding to the URI, causing creation of a mapping entry corresponding to the resource to enable the requesting client to obtain the targeted resource by at least:

requesting creation of a peer-to-peer session that makes the targeted resource corresponding to the URI available to the requesting client via a peer-to-peer-based protocol by at least invoking a session creation service configured to produce peer-to-peer session connection information for retrieving the targeted resource from one or more peer-to-peer sources having the targeted resource in response to the creation request;

receiving a session creation notification including peer-to-peer session connection information that enables connection to the created peer-to-peer session; and adding a mapping entry to the mapping data structure with the added mapping entry corresponding to the URI and associating the peer-to-peer session connection information with the URI.

8. The method as recited in claim 7, wherein:

the act of extracting comprises extracting multiple respective peer-to-peer session connection information packages that correspond to multiple respective different types of peer-to-peer networks; and the act of sending comprises sending the multiple respective peer-to-peer session connection information packages in response to the act of receiving the mapping request.

9. The method as recited in claim 7, wherein the method further comprises:

if the mapping data structure is not ascertained to include a mapping entry corresponding to the URI, sending a mapping response including a negative result indicating that no known peer-to-peer session connection information is associated with the URI of the mapping request.

10. The method as recited in claim 7, wherein the method further comprises:

if the mapping data structure is not ascertained to include a mapping entry corresponding to the URI, creating the peer-to-peer session that makes the targeted resource corresponding to the URI available via the peer-to-peer-based protocol; and sending the session creation notification including the peer-to-peer session connection information that enables connection to the created peer-to-peer session.

11. The method as recited in claim 10, wherein:

the mapping request is received from a directory client, and the mapping response is sent to the directory client;

the acts of receiving a mapping request, accessing, and sending a mapping response are performed, at least partially, by a directory service;

the acts of ascertaining and extracting are performed, at least partially, by a peer-to-peer session indexing service; and the acts of creating and sending the session creation notification are performed, at least partially, by a peer-to-peer session creation service.

12. The method as recited in claim 7, wherein the method further comprises:

receiving from a client a new URI and new peer-to-peer session connection information; and adding a new mapping entry to the mapping data structure, the new mapping entry associating the new URI with the new peer-to-peer session connection information.

13. A method for automatic distributed downloading implemented by a directory client device, the method comprising:

sending to a directory service a mapping request that includes a uniform resource identifier (URI) corresponding to a targeted resource and a source that makes the targeted resource available via a client-server-based protocol;

receiving from the directory service a mapping response that includes peer-to-peer session connection information associated with the URI;

invoking an aggregate downloader to:

establish, as an initial configuration, multiple sessions with multiple sources of the targeted resource indicated by the mapping response, the multiple sources including a peer-to-peer source and a client-server source by at least creating multiple protocol implementers each corresponding to one of the multiple sources indicated by the mapping response;

manage the multiple sessions to coordinate downloading of the targeted resource using the multiple sessions and corresponding protocol implementers by at least assigning different chunks of the targeted resource to different protocol implementers to simultaneously obtain chunks of the targeted resource from the multiple sources and aggregate the chunks;

after the initial configuration and during the coordinated downloading of the targeted resource, add one or more additional sessions with one or more new sources to the coordinated downloading of the targeted resource, the one or more additional sessions being added to the coordinated downloading in response to the one or more new sources being identified by the directory client device;

upon detection that one or more peer-to-peer sources for the targeted resource are not listed in the mapping response, invoke a session creation service to produce peer-to-peer session connection information for retrieving the targeted resource from one or more peer-to-peer sources and create a mapping entry for the targeted resource that enables portions of the targeted resources to be downloaded by the directory client device;

retrieving at least part of the targeted resource over a peer-to-peer network via a peer-to-peer-based protocol using the peer-to-peer session connection information;

the acts of sending, receiving, and invoking being performed concurrently with an initiated download of at least a portion of the targeted resource from the source via the client-server-based protocol; and based on a comparison of a received hash value associated with the URI to a computed hash value associated with the retrieved targeted resource, retrieving the targeted resource directly from the source via the client-server-based protocol using the URI when the received hash value does not match the computed hash value.

14. The method as recited in claim 13, wherein the method further comprises:
receiving from a requesting application a resource request that includes the URI for the targeted resource; and
providing the retrieved targeted resource to the requesting application.

15. The method as recited in claim 13, wherein the act of retrieving comprises downloading chunks of the targeted resource from the peer-to-peer network via the peer-to-peer-based protocol using the peer-to-peer session connection information; and wherein the method further comprises:
downloading other chunks of the targeted resource from the source via the client-server-based protocol using the URI; and combining the chunks downloaded via the peer-to-peer-based protocol and the other chunks downloaded via the client-server-based protocol to form the targeted resource.

16. The method as recited in claim 13, wherein:
the peer-to-peer network comprises a first peer-to-peer network, the peer-to-peer-based protocol comprises a first peer-to-peer-based protocol, and the peer-to-peer session connection information comprises first peer-to-peer session connection information;
the act of receiving comprises receiving from the directory service the mapping response with the mapping response including the first peer-to-peer session connection information associated with the URI and second peer-to-peer session connection information associated with the URI;
the act of retrieving comprises downloading chunks of the targeted resource from the first peer-to-peer network via the first peer-to-peer-based protocol using the first peer-to-peer session connection information; and
the method further comprises:
downloading other chunks of the targeted resource from a second peer-to-peer network via a second peer-to-peer-based protocol using the second peer-to-peer session connection information; and
combining the chunks downloaded via the first peer-to-peer-based protocol and the other chunks downloaded via the second peer-to-peer-based protocol to form the targeted resource.

17. The method as recited in claim 13, wherein the act of sending comprises sending to the directory service the mapping request with the mapping request including identification of one or more supported communication protocols and at least one supported hashing algorithm.

* * * * *